(12) United States Patent
Yablonovitch

(10) Patent No.: US 6,401,007 B1
(45) Date of Patent: Jun. 4, 2002

(54) GAGE ELEMENT FOR PERFORMING AUTOMATIC SETTING OF A MACHINE FOR MANIPULATING ARTICLES, SUCH AS A PALLETIZATION MACHINE

(75) Inventor: Max Yablonovitch, Dollard-des-Ormeaux (CA)

(73) Assignee: Kalish Canada Inc., Kirkland (CA)

( * ) Notice: Subject to any disclaimer, the term of this patent is extended or adjusted under 35 U.S.C. 154(b) by 0 days.

(21) Appl. No.: 09/293,122

(22) Filed: Apr. 16, 1999

(51) Int. Cl.[7] .................................................. G06F 7/00
(52) U.S. Cl. ........................ 700/225; 700/213; 700/226
(58) Field of Search .................................. 700/217, 218, 700/214, 257, 261, 213, 225, 226, 227

(56) References Cited

U.S. PATENT DOCUMENTS

| | | | |
|---|---|---|---|
| 3,894,217 A | * 7/1975 | Ekuburo et al. | |
| 4,204,639 A | * 5/1980 | Barber et al. | 235/488 X |
| 4,969,109 A | 11/1990 | Mizuno et al. | |
| 5,175,692 A | 12/1992 | Mazouz et al. | |
| 5,239,807 A | * 8/1993 | Soleri | 53/451 X |
| 5,245,675 A | * 9/1993 | Ferre et al. | 382/27 X |
| 5,384,177 A | * 1/1995 | Rissman | 428/182 X |
| 5,422,861 A | * 6/1995 | Stringer et al. | 367/99 X |
| 5,477,762 A | * 12/1995 | Meulnart | 83/364 X |
| 5,501,571 A | 3/1996 | Van Durrett et al. | |
| 5,638,460 A | * 6/1997 | Nishimori et al. | 382/141 |
| 5,794,416 A | * 8/1998 | Rahman | 53/540 |
| 5,844,807 A | 12/1998 | Anderson et al. | |
| 5,908,283 A | * 6/1999 | Huang et al. | 700/217 X |
| 6,029,851 A | * 2/2000 | Jenkins et al. | 221/102 X |
| 6,055,462 A | * 4/2000 | Sato | 700/217 X |
| 6,090,027 A | * 7/2000 | Brinkman | 493/54 X |

FOREIGN PATENT DOCUMENTS

| | | |
|---|---|---|
| EP | 0 265 894 | 5/1988 |
| JP | 57-193869 | 5/1981 |
| JP | 57-199079 | 6/1981 |

* cited by examiner

Primary Examiner—Christopher P. Ellis
Assistant Examiner—Gene O. Crawford
(74) Attorney, Agent, or Firm—Ratner & Prestia

(57) ABSTRACT

The present invention relates to a gage element constituting a reference unit against which a certain article, such as a cardboard box can be compared to determine if a condition of a dimensional match exists. The gage element includes a computer readable storage medium holding a plurality of data elements associated with the box. The computer readable storage medium has an output allowing the data elements to be transferred to an apparatus for processing the certain article, the data elements being operative to alter the settings of the apparatus so as to-adapt it specifically for the box to be currently processed. In a specific example, this apparatus is a palletizer machine that arranges individual boxes into a stack forming a pallet. The data elements could be the dimensions of the box, the weight of the box, the stacking pattern and the dimensions of the stack, among others.

20 Claims, 4 Drawing Sheets

GAGE ELEMENT FOR PERFORMING AUTOMATIC SETTING OF A MACHINE FOR MANIPULATING ARTICLES, SUCH AS A PALLETIZATION MACHINE

FIELD OF THE INVENTION

The present invention relates to the art of processing individual articles and more particularly to a device for facilitating the setting of an apparatus to process such articles. More specifically, the invention relates to a gage element constituting a reference unit against which a certain article can be visually compared to determine if a condition of the dimensional match exists. The gage element features a computer readable storage medium holding data elements that can be used to alter the settings of the apparatus to adapt it specifically to the article that is to be processed. The invention also extends to a transfer device that includes the functionality of the gage element defined earlier and that also includes a gripping unit to pick up and to release the article. Finally, the invention also extends to a palletizer machine for arranging articles in the stack.

BACKGROUND OF THE INVENTION

Industrial processes that require manipulation of individual articles are often carried out with automated equipment. A typical example is the process of stacking and palletization of cardboard boxes. Such cardboard boxes, that may contain many different kinds of discrete items, are delivered on a conveyor belt to a palletization machine that individually picks up the boxes and arranges them in a pre-determined stacking pattern. The boxes are usually stacked onto a pallet and when the stack is built, a lift or any other suitable carrying device carries the stack to another processing station for wrapping the stack and then for shipping it.

A typical palletization machine includes an actuator to which is mounted a transfer device in order to move the individual boxes from the end of the conveyor belt to the stack. The transfer device includes a gripping unit that picks up the box so it can be transported to the stack and when the box is moved to its proper position in the stack, the gripping unit releases the box. A controller that includes a central processing unit (CPU) controls the movement of the actuator.

Palletization machines available on the market today are designed to handle a wide variety of box dimensions, shapes and weights. In order to properly set the apparatus for a certain job, an operator must manually enter on a keypad certain characteristics that will allow the machine to properly stack the boxes, Those characteristics are typically the dimensions of the box, the number of boxes in a finished pallet, the weight of the box, the stacking pattern and the size of the pallet to be built. The necessity to manually enter this data in the memory of the palletizer machine is a potential source of error. If for some reason a parameter of the stacking operation is wrongly entered, the palletizer machine will operate incorrectly which may result in damage to the machine itself or to the contents of a box.

Therefore, there exists a need in the industry to facilitate the setting of an apparatus to process articles in order to reduce the possibility of incorrect data entry as a result of human error.

OBJECT AND STATEMENT OF THE INVENTION

An object of the present invention is to provide a device that can facilitate the setting of an apparatus for processing individual articles.

As embodied and broadly described therein, the invention provides a gage element characterized by a certain dimensional feature, said gage element constituting a reference unit against which a certain article can be visually compared to determine if a condition of dimensional match exists between said gage element and the certain article, said gage element including:

a computer readable storage medium holding a plurality of data elements associated with the certain article;

an output permitting the data elements on said computer readable storage medium to be transmitted to an apparatus for processing the certain article, the data elements being operative to alter a setting of the apparatus to adapt the apparatus to process the certain article.

In a most preferred embodiment of the invention, the gage element is in the form of an interchangeable part that is mounted to the actuator of the palletization machine This is the sole operation necessary in order to set the machine for a particular box type to be handled. More specifically, the gage element forms a transfer device that is releasably attached to the end of the actuator of the palletization machine. The transfer device includes a gripping unit to selectively pick up and release a box. In a specific example, the gripping units can be a vacuum device, including one or more suction cups that can engage one of the walls of the box to retain it against the transfer device.

It should be appreciated that the gripping unit is not necessarily a vacuum operated device only as other possibilities can be envisaged without departing from the spirit of the inventions For instance, the gripping unit can be a mechanical system utilizing fingers designed to grip the box or the article that is to be manipulated. Other possibilities will also be clearly apparent to the person skilled in the art.

The transfer device includes a computer readable storage medium holding information relative to the article to be processed, such as the size of the box, the stacking pattern and the dimensions of the stack and the weight of the box, among others. When the transfer device is connected to the actuator, the information held in the computer readable storage medium is transferred to the controller of the palletization machine to alter its settings. The transfer is effected through a data communication port that becomes operational when the transfer device is mechanically coupled to the actuator. At the same time, a suitable vacuum connection is established between the suction cups and a vacuum source. In a specific example such vacuum connection can be realized through any suitable pneumatic coupling.

The first step of the method to set up the palletization machine for a particular job is to select the proper transfer device. The operator effects this by visually comparing a box of the type to be manipulated with a series of available transfer devices that would usually be provided with the palletization machine. The transfer device that dimensionally matches the box is coupled to the actuator arm which establishes a pneumatic connection with the vacuum source and at the same time, initiates or at least enables the data communicative relationship between the computer readable storage medium on the transfer device and the main controller of the machine.

In a specific example, the transfer device is in the form of a plate having two main surfaces. On one of the main surfaces of the plate are mounted the suction cups while the other main surface carries the pneumatic coupling and the data port. The size of the plate is selected to match in terms of dimensions the size of one of the walls of the box, such as the top wall. In this specific example, the expression "dimensional match" means that the size of the plate is about the same as the size of the top wall, thus, the operator can visually determine, by placing the plate on the box if the transfer device matches the box to be handled. There is little possibility of error since one can easily determine if a given transfer plate dimensionally matches the box or not.

The dimensional match can be bi-dimensional or three-dimensional. In general, what is meant by "dimensional match" is a condition where the gage element (or the transfer device when playing also the role of a gage element) matches one or more dimensions of the article to be processed such as the box. In the example above, a bi-dimensional match is used. A three dimensional match could be effected by providing the transfer device with a three dimensional configuration that is designed to mate with the box. Such three dimensional configuration could be attained by providing the plate of the transfer device with a side flap projecting downwardly from the plate and designed to serve as a box height reference. To verify the dimensional match the operator places the transfer device on top of the box and visually verifies that the size of the top plate is about the same as the top of the box and also that the height of the side flap extends down to the lower edge of the box.

Once the proper transfer device has been selected, it is coupled to the end of the actuator arm. The uploading of the information from the computer readable storage medium then completes the setting of the machine and the operation of the palletizer machine can begin.

The possibility of human error in properly setting the palletizer machine is significantly reduced since the operator is no longer required to enter data on a keypad or on any other similar information input device.

As embodied and broadly described herein, the invention also provides a transfer device for connection to an actuator unit of an apparatus for processing a certain article, the transfer device capable of retaining and displacing the certain article along a path of travel established by a movement of said transfer device imparted to said transfer device by the actuator unit, said transfer device including;
- a body;
- gripping unit mounted to said body, said gripping unit capable to selectively acquire an operative mode and an inoperative mode, in said operative mode said gripping unit holding the certain article to permit displacement the certain article along the path of travel, in said inoperative mode said gripping unit releasing the certain article;
- a computer readable storage medium holding a plurality of data elements associated with the certain article;
- an output permitting the data elements on said computer readable storage medium to be transmitted to the apparatus for processing the certain article, the data elements being operative to alter a setting of the apparatus to adapt the apparatus to process the certain article.

As embodied and broadly described herein, the invention also provides a palletizer machine for arranging articles in a stack, said palletizer machine comprising:
- a control unit, including:
  (i) a central processing unit;
  (ii) a memory in a data communicative relationship with said central processing unit, said memory capable of holding data for processing by said central processing unit to generate control signals to regulate arrangement of the articles in a stack;
- an actuator responsive to the control signals to successively pick individual articles and arrange the individual articles in the stack, said actuator including a transfer element mounted to said actuator, said transfer element having:
  (i) a gripping unit capable to selectively acquire an operative mode and an inoperative mode, in said operative mode said gripping unit holding a certain article to permit displacement of the certain article along a path of travel of said actuator, in said inoperative mode said gripping unit releasing the certain article;
  (ii) a computer readable storage medium for holding a plurality of data elements associated with the certain article;
  (iii) an output in a data communicative relationship with said control unit to permit transfer of the data elements to said memory to allow said control unit to generate the control signals at least partly in dependence upon the data elements.

DESCRIPTION OF A PREFERRED EMBODIMENT

Figure 1:
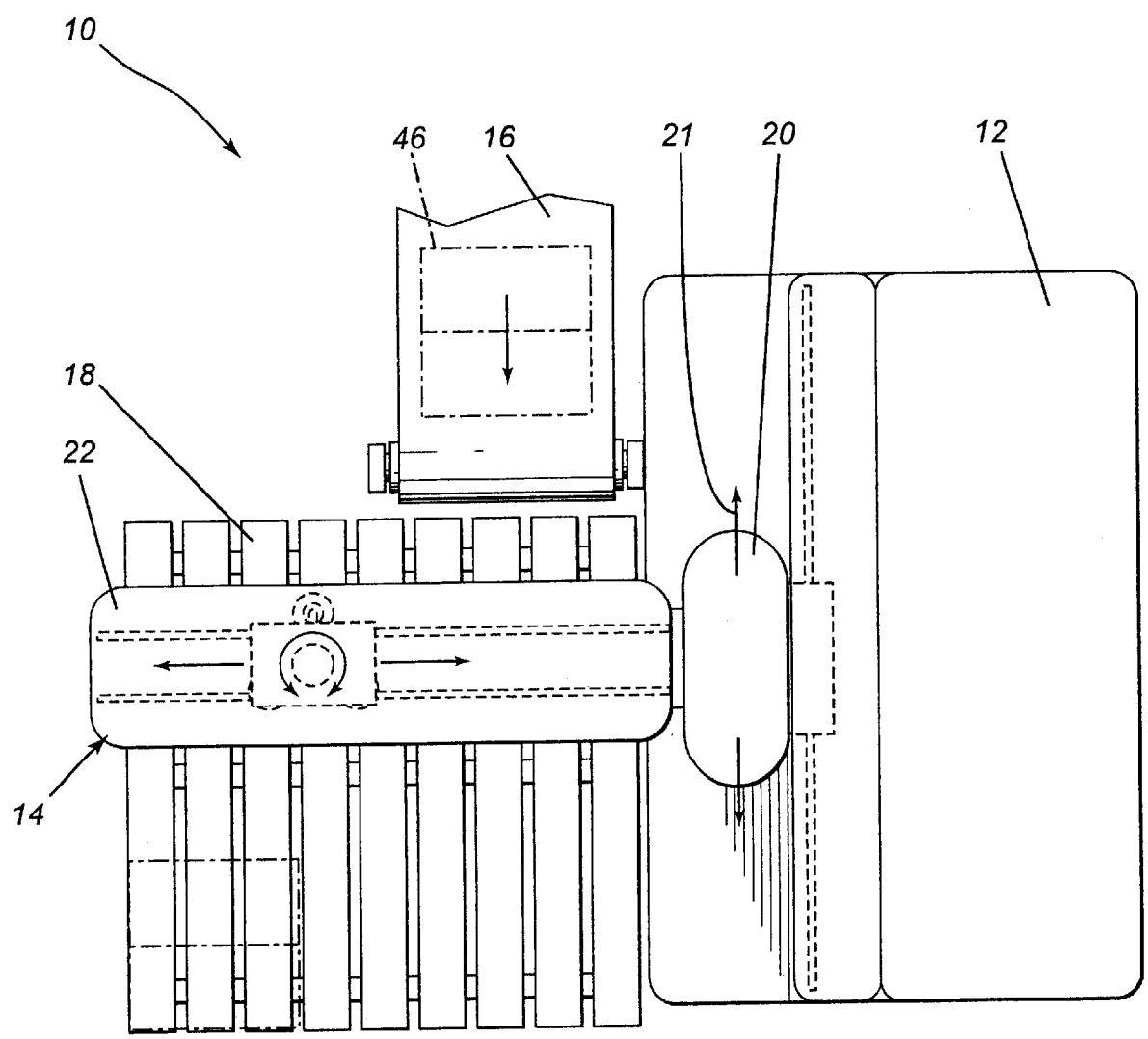
FIG. 1 is a top plan view of a palletizer machine in accordance with a preferred embodiment of the present invention.
Figure 2:
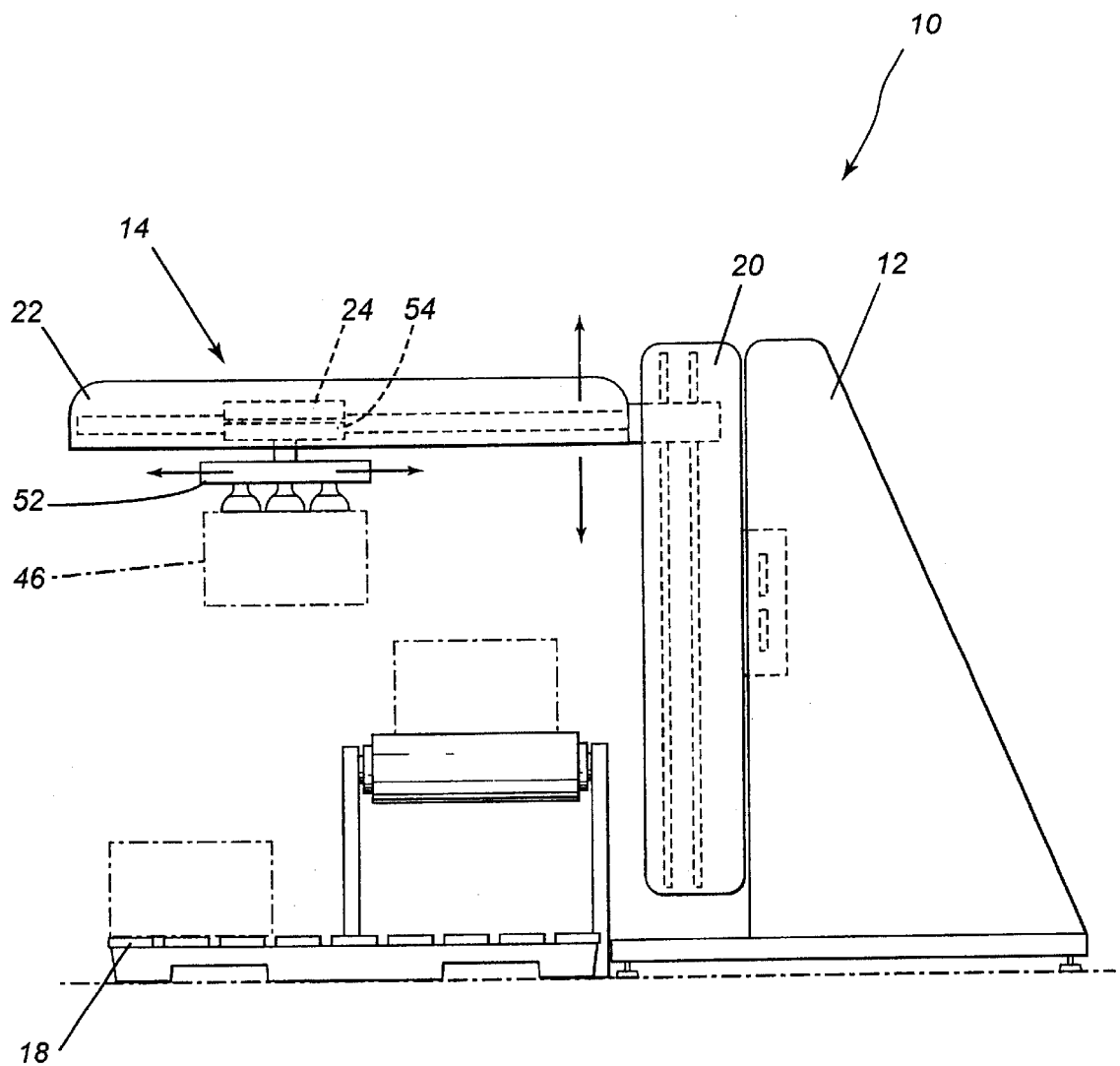
FIG. 2 is a side elevational view of the palletizer machine depicted in FIG. 1.

FIGS. 1 and 2 of the annexed drawings illustrate a palletizer machine in accordance with a preferred embodiment of the invention. The palletizer machine is identified by the reference numeral 10 and comprises a frame 12 to which is mounted an actuator 14. The purpose of the actuator 14 is to pick up individual boxes arriving on conveyor belt 16 and arrange them according to a predetermined stacking pattern on a pallet 18.

The actuator 14 is a multi-track assembly including a vertical track 20 that can travel horizontally on the frame of the palletizer machine (the movement of the track 20 is illustrated by the arrow 21) and a horizontal track 22 that can be displaced vertically on the track 20. Finally, a palletizer head 24 is mounted on the horizontal track 22 for horizontal movement thereon. The palletizer head 24 picks up individual boxes from the conveyor belt 16 and deposits the boxes on the pallet 18. The palletizer head 24 can move vertically by displacing the horizontal track 22 relative the vertical track 20. The palletizer head 24 can move by translation in the track 22 to achieve horizontal movement. Finally, the palletizer head can rotate about a vertical axis at any point of its path of travel in the track 22 so as to change the orientation of the box it holds.

Figure 3:
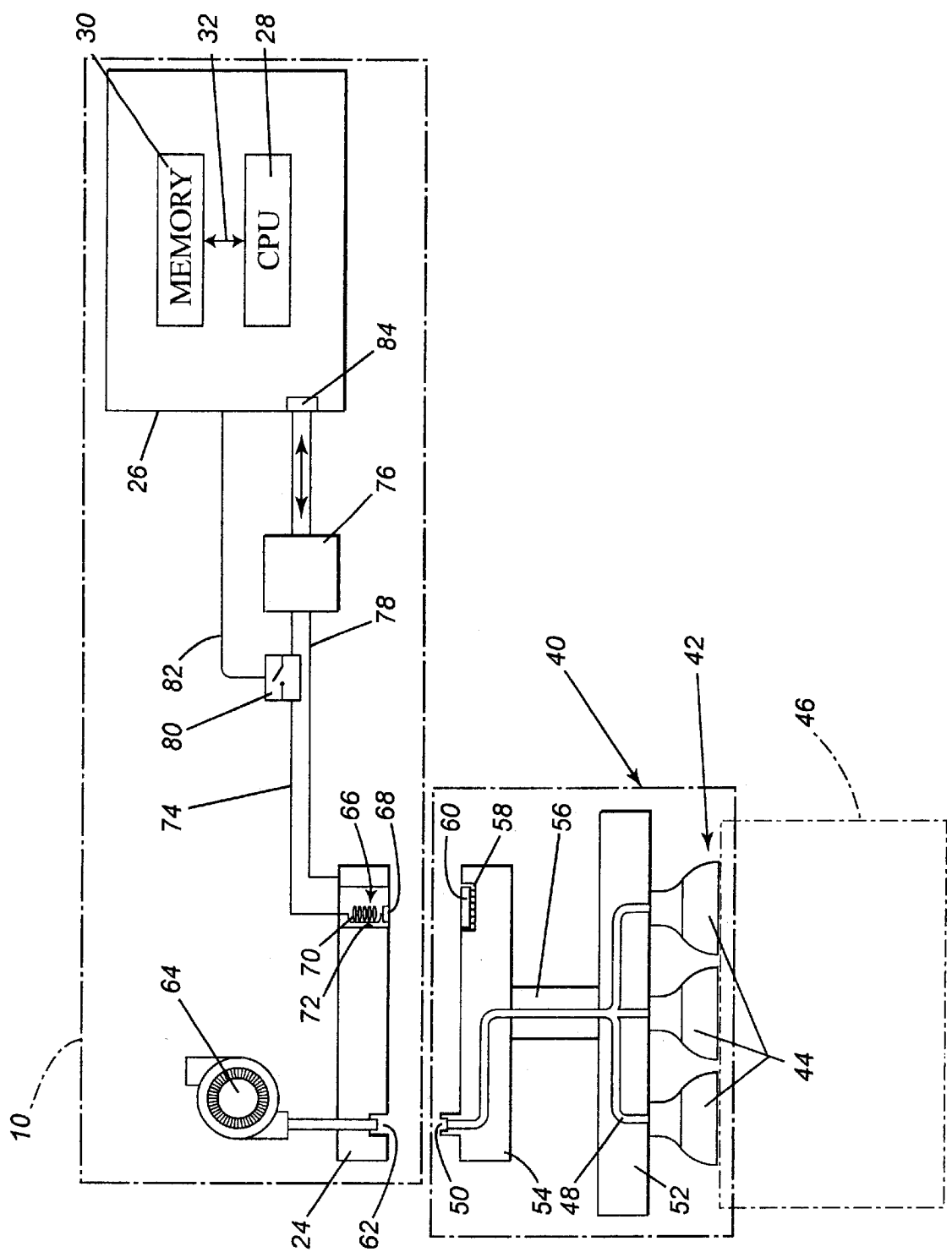
FIG. 3 is a schematical view of the controller of the palletizer machine shown in FIG. 1, also depicting the connection between the transfer device of the palletizer machine and the actuator of the machine.

An electronic controller mounted in the frame 12 of the machine controls the movement of the palletizer head. FIG. 3 provides a functional block diagram of the controller. The latter, identified by the reference numeral 26 includes a central processing unit (CPU) 28 and a memory 30 connected to one another by a bus 32. The CPU 28 executes program instructions residing in the memory 30 and also processes data in order to generate control signals that regulate the movement of the actuator 14 and in particular the displacement of the palletizer head 24.

Figure 4:
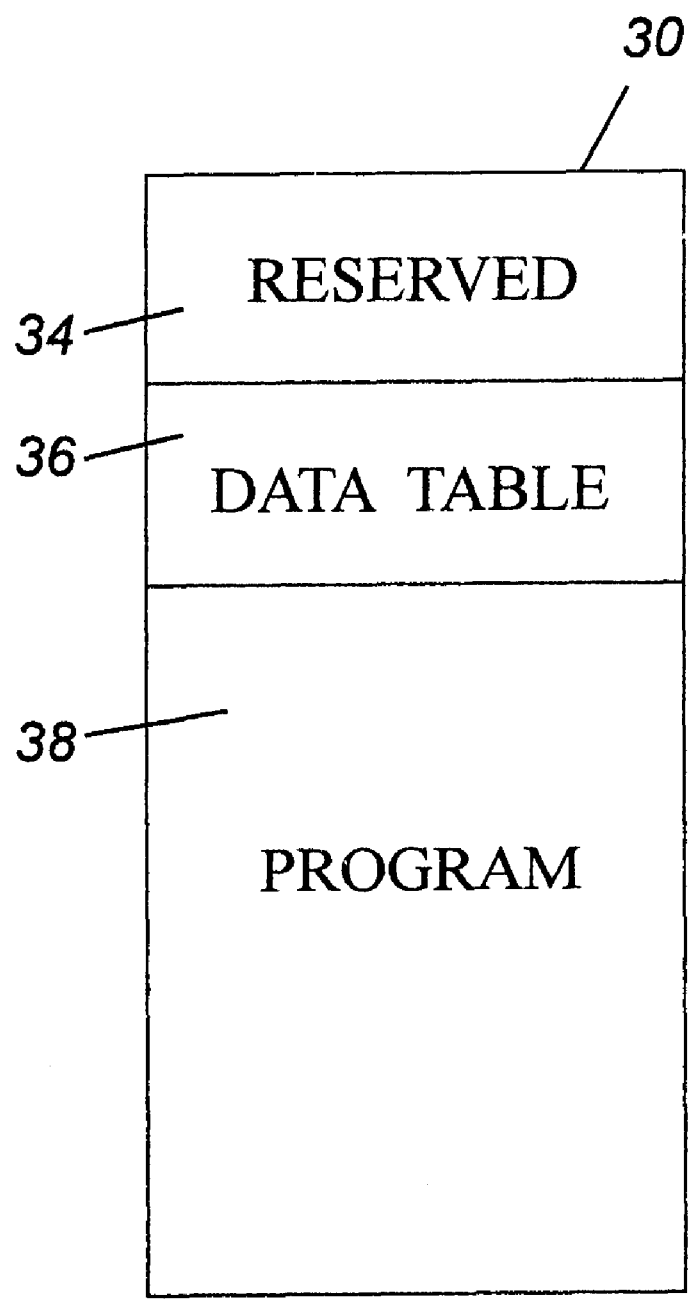
FIG. 4 is a table illustrating the structure of the memory of the controller holding the program element and the data that is processed by a CPU to operate the palletizer machine.

The structure of the memory 30 is illustrated in greater detail in FIG. 4. The memory includes a reserved section 34, followed by a data table section 36 and finally by the program section 38. The program section 38 retains the program instructions executed by the CPU 28 during the operation of the palletizer machine. As to the data table section 36 it retains data that is necessary to the program element residing in the program section 38 to control the movement of the palletizer head 24. In a specific example, such data can be the dimensions of the box to be handled, the stacking pattern, and the dimensions of the stack (such as the number of boxes in the stack, etc). Based on this information, the program element when executed by the CPU 28 will generate the proper control signals to the actuator 14 so as to adequately control the movement of the palletizer head 24.

Referring back to FIG. 3, the palletizer head 24 (the remaining of the actuator structure is not shown in the interest of clarity) is coupled to a transfer device 40 that is releasably coupled to the palletizer head 24. The transfer device 40 includes a gripping unit 42, in form of a plurality of suction cups 44 designed to engage and hold on to the upper surface of a box 46, shown in dotted lines immediately below the transfer device 40. Vacuum is supplied to the individual suction cups 44 through channels 48. The network of channels 48 extends to a pneumatic coupling 50.

The transfer device when viewed from the side has the shape of a dual plate structure including a bottom rectangular plate 52 to which are mounted the suction cups 44. A top plate 54 mates the transfer device 40 with the palletizer head 24. A bar 56 or any other suitable link is provided to retain the plates 52 and 54 to one another. The plates 52 and 54 and the bar 56 are provided with suitable internal cavities to form the network of channels 48. Alternatively, external conduits can be used between the pneumatic coupling 50 and the suction cups 44 if internal cavities are not desirable.

On the top surface of the upper plate 54 is machined a recess 58 in which is inserted a computer readable storage medium in the form of a chip 60 housed in a stainless steel enclosure. The dimensions of the recess 58 are selected to match those of the chip 60 such that when the chip 60 is placed in the recess 58 the top surface of the chip 60 is flush with the surface of the plate 54. The chip 60 is essentially a memory based device including a suitable interface forming a data port through which the data stored in the memory can be transmitted to an external unit. In a specific example, a chip 60 manufactured by Dallas Semiconductor and commercialized under the trade mark iButton has been found to be satisfactory for this application. This particular device includes a memory that can be read and also written to but for the present application the ability of the memory to be written to is not used.

The palletizer head 24 includes a pneumatic coupling 62 that engages the pneumatic coupling 50 when the transfer device 40 is mounted to the palletizer head 24. When both pneumatic couplings are mated, a fluid path is established between the channels 48 and a vacuum source 64. This vacuum source can typically be a vacuum pump and it can be mounted at any convenient location of the palletizer machine 10. The palletizer head also includes an electrical terminal 66 that connects with the chip 60 to allow the data in the chip 60 to be transmitted to the controller 26 of the palletizer machine 10. More specifically, the electrical terminal 66 includes a contact portion 68 mounted to the palletizer head 24 by means of a coil spring 70. The electrical terminal 66 is placed in a cavity 72 of the palletizer head 24 such that the contact portion 68 remains out of contact of the walls of the cavity 72.

When the transfer device 40 is coupled to the palletizer head 24 the contact portion 68 engages the top wall of the chip 60. It is through that top wall that the data is transmitted from the chip 60. The signal propagates through the coil spring 70 and over a conductor 74 that leads to a protocol translator 76. An additional conductor 78 couples the protocol translator 76 to the frame of the palletizer head 24. The conductor 74 transmits the data signals while the conductor 78 provides noise immunity. The system can be implemented with a single conductor (conductor 74) but this could lead to corrupted messages due to electrical noise in the machine frame.

A read switch 80 is preferably provided in the conductor 74 that can be opened to ensure that no communication is taking place with the chip 60. Preferably, the read switch 80 is under the control of the controller 26. The line 82 illustrates this functional relationship. When the read switch is closed a read operation of the memory in the chip 60 occurs.

The protocol translator 76 is in itself a small computing apparatus including a CPU and a memory containing a program element that simply re-formats the data received from the chip 60 according to a protocol that the controller 26 is designed to read. The protocol translator 74 communicates with the controller 26 through a bi-directional serial bus connecting to the serial port 84 of the controller 26.

When the transfer device 40 is coupled to the palletizer head 24, two events occur. First, the coupling 50 and 62 engage to allow a negative pressure to be established from the vacuum source to the suction cups 44. Second, the contact portion 68 engages the top wall of the chip 60. The top wall forms a contact portion and it is electrically insulated from the remainder of the housing. If the read switch 80 is in the opened condition no data transfer occurs. However, if the switch 80 is closed, then the impedance sensed by the chip 60 triggers the data transmission process. Accordingly, data is sent serially over the conductor 72 to the protocol translator 74 that re-formats the data and sends it to the controller 26 where it is loaded in the section 36 of the memory 30.

In a specific example, the data sent from the chip 60 to the controller 26 might be the following:

| FIELD NUMBER | INFORMATION |
| --- | --- |
| 1 | Height of pallet |
| 2 | Length of pallet |
| 3 | Width of pallet |
| 4 | Length of box |
| 5 | Width of box |
| 6 | Height of box |
| 7 | Total number of boxes to stack on each pallet |
| 8 | Height difference conveyor 16 surface and top of pallet 18 |
| 9 | Bar code face of box 0 = none. 1, 2, 3 or 4 |
| 10 | Stacking pattern of boxes on pallet |
| 11 | Approximate weight of box |
| 12 | Parameter set |

In a prior art device this information needs to be entered on a keypad of the palletizer machine in order to set-up the machine for the particular job to be done. With the present invention, the data transmission process is automatic and the operator does not need to key in any data. This reduces the possibility of data entry error.

It is preferred to connect the transfer device 40 with the palletizer head 24 through a quick connect mechanical coupling system of the type known in the art that allows the operator to rapidly install and remove the transfer device 40 on the palletizer head 24. Such quick connect mechanical couplings are well known to those skilled in the art and it is not deemed necessary to describe them in detail here.

In use the operator of the palletizer machine 10 first sets up the machine for the particular job to be performed. This involves selecting the proper transfer device 40 in accordance with the boxes to be stacked. Usually, the operator will have at his disposal a plurality of different transfer devices, each transfer device being associated to a particular type of box, The operator uses the transfer devices as gages, by matching them against the box. When a condition of dimensional match is found, such as for example, the dimensions of the bottom plate 54 match those of the top wall of the box, then this visually indicates to the operator that proper transfer device has been found. Next, the operator connects the transfer device 40 to the palletizer head 26 and the machine is automatically set-up as described earlier. The machine is then ready for operation.

While particular embodiments of the present invention have been illustrated and described, it would be obvious to those skilled in the art that various other changes and modifications can be made without departing from the spirit and scope of the invention.

I claim:

1. A gage element constituting a reference against which an article is visually compared to determine if a condition of match exists between said gage element and the article, said gage element including:

a computer readable storage medium;

a plurality of data elements stored in said computer-readable storage medium, said data elements being associated with a set of articles, each article belonging to the set of articles establishing a condition of match with said gage element when visually compared against said gage element; and an output permitting said data elements in said computer-readable storage medium to be transmitted to an apparatus for processing articles, said data elements being operative to alter at least one setting of the apparatus to adapt the apparatus to process articles belonging to the set of articles.

2. A gage element as defined in claim 1, wherein said data elements are indicative of dimensional characteristics common to articles belonging to the set of articles.

3. A gage element as defined in claim 1, wherein said data elements are indicative of a weight common to articles belonging to the set of articles.

4. A gage element as defined in claim 1, wherein said condition of match is a condition of dimensional match.

5. A gage element as defined in claim 1, wherein said gage element is capable of being releasably mounted to the apparatus to process articles belonging to the set of articles, said gage element including a gripping unit, said gripping unit capable to selectively acquire an operative mode and an inoperative mode, in said operative mode said gripping unit holding an article from the set of articles to permit manipulation of the article by the apparatus, in said inoperative mode said gripping unit releasing the article.

6. A gage element as defined in claim 5, wherein said gripping unit includes a vacuum holding device.

7. A gage element as defined in claim 6, wherein said vacuum holding device includes a plurality of suction cups capable of engaging a surface of the article.

8. A gage element as defined in claim 1, wherein the articles are boxes.

9. A gage element as defined in claim 8, wherein one data element is indicative of a width of the boxes.

10. A gage element as defined in claim 8, wherein one data element is indicative of a height of the boxes.

11. A gage element as defined in claim 8, wherein one data element is indicative of a length of the boxes.

12. A gage element as defined in claim 8, wherein one data element is indicative of a weight of the boxes.

13. A gage element as defined in claim 1, wherein the apparatus is a palletizer machine.

14. A gage element as defined in claim 13, wherein one data element is indicative of a length of a pallet to be formed by the palletizer machine by stacking a plurality of the articles together.

15. A gage element as defined in claim 13, wherein one data element is indicative of a width of a pallet to be formed by the palletizer machine by stacking a plurality of the articles together.

16. A gage element as defined in claim 13, wherein one data element is indicative of a height of a pallet to be formed by the palletizer machine by stacking a plurality of the articles together.

17. A gage element as defined in claim 13, wherein the articles are boxes.

18. A gage element as defined in claim 17, wherein one data element is indicative of a total number of boxes to stack on a pallet to be formed by the palletizer machine.

19. A gage element as defined in claim 17, wherein one data element is indicative of a stacking pattern of boxes on a pallet to be formed by the palletizer machine.

20. In combination:

a set of articles having identical three-dimensional configurations; and a gage element, a) when visually compared to any one of the articles in said set, a condition of match being established between said gage element and the article;

b) when visually compared to a different article that has a three-dimensional configuration different from the three-dimensional configuration of the articles of said set, an absence of match being established between said gage element and the different article;

c) said gage element including:

i) a computer-readable storage medium;

ii) a plurality of data elements stored in said computer-readable storage medium, the data elements being associated with the articles in said set of articles;

iii) an output for releasing the data elements to an apparatus suitable for selectively processing articles from said set of articles and the different article;

iv) the data elements being operative to alter at least one setting of the apparatus to adapt the apparatus to process the articles from said set; and v) the alteration of the at least one setting rendering the apparatus unsuitable to process the different article.

* * * * *